June 10, 1958 M. J. H. STAAR 2,838,315

MEANS FOR CENTERING GRAMOPHONE RECORDS

Filed July 17, 1953

Inventor

Marcel Jules Helene Staar by Karl Michaelis, atty.

United States Patent Office 2,838,315

Patented June 10, 1958

2,838,315

MEANS FOR CENTERING GRAMOPHONE RECORDS

Marcel Jules Helene Staar, Ixelles, Brussels, Belgium

Application July 17, 1953, Serial No. 368,563

Claims priority, application Belgium July 19, 1952

2 Claims. (Cl. 274—39)

This invention relates to a phonograph apparatus and more particularly to means for centering phonograph records on record turntables.

It is a general object of the present invention to provide an attachment for a record turntable which is effective for centering records having a large diameter center hole, for example 45 R. P. M. records, as well as 33⅓ R. P. M. or 78 R. P. M. records having a small diameter, spindle size center hole. More specifically, it is an object of the present invention to provide such an attachment, spring mounted in a central recess formed in the record turntable to be movable between a raised position and a lowered position, the bias force of the spring being relatively light so that it is compressed when the attachment is lowered by the weight of 33⅓ R. P. M. records resting on the turntable to allow attachment to sink into the depression yet positively urges the attachment to a raised position fitting in the center hole of a 45 R. P. M. record resting on the turntable. Moreover, a further object of this invention is to provide a centering element which fits closely about the spindle so that the spindle guides the element in its vertical movement, and employing a centrally arranged spring which assures smooth sliding action of the centering element which is particularly important in the operation of the attachment in connection with light weight records.

In the drawings affixed to this specification and forming part thereof an embodiment of the invention is illustrated diagrammatically by way of example.

In the drawings:

Fig. 1 is a vertical section;

Fig. 1*a* is an enlarged fragmentary sectional view illustrating a modification of the centering element shown in Figure 1;

Figures 1, 2, 3:
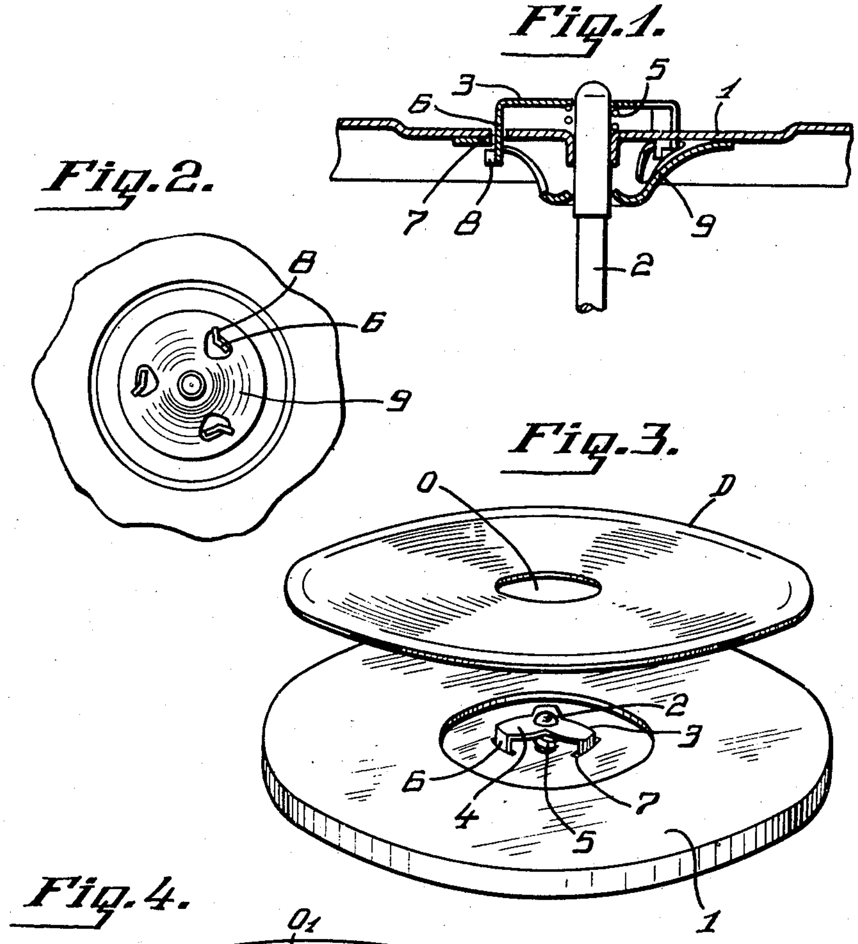
Fig. 2 is a view from below.
Figs. 3 and 4 are diagrammatic views.
Figure 4:
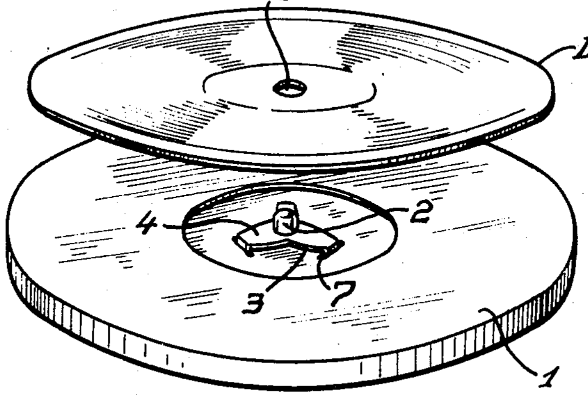
Figure 1A:
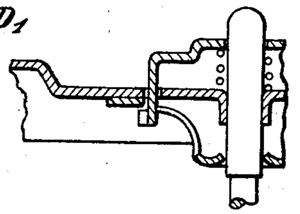

Referring to the drawings, there is slidably fixed on the top end 2 of the shaft projecting from the turntable 1 a metal disc or cap 3 formed with three radial arms 4 which is supported by the spring 5 resting on the turntable. The portions 6 of the arms 4 are bent downwards and project through slots 7 formed in the turntable 1, forming a circumferential surface of relatively large diameter for centering 45 R. P. M. records. The slots are made oversize relative to the arms so that the arms fit loosely therein, and the spindle 2 operates to guide the centering element, as shown in Figure 1. For movably securing the centering element to the turntable, the lower ends of the bent down portions of each of the radial arms 4 are formed to extend laterally outwardly beyond the edge of the respective slot, this formed portion 8 also operating as a stop to limit the vertical movement of the centering element.

A record D such as a 45 R. P. M. record with a large diameter center hole O will be centered around the circumference of the disc 3 (Fig. 3), while a record $D_1$ with an ordinary size center hole of about 9/32″ such as 33⅓ R. P. M. and 78 R. P. M. records have, in slightly compressing the spring 5 will lower the centering element into the depression in the turntable and will be centered by the top end 2 of the spindle. When this record is taken off, the spring will return the disc 3 to its upper position.

The ends 6 of the arms 4 couple the piece 3 with the turntable. These arms may be stepped to define a stepped circumferential surface to provide for the centering of records with center holes of different sizes.

I wish it to be understood that I do not desire to be limited to the details described in the foregoing specification and shown in the drawings for obvious modifications will occur to a person skilled in the art.

I claim:

1. In a record turntable having a spindle of about 9/32″ for centering records with smaller size center holes such as 33⅓ R. P. M. and 78 R. P. M. records, an attachment for centering records having a relatively large diameter center hole such as 45 R. P. M. records, said attachment being mounted for vertical movement between a position in a depression in the center of the turntable and a raised position projecting above the surface of the turntable and comprising in combination, a centering element fitting closely about the spindle for vertical sliding movement between the said positions, a plurality of arms extending from the underside of said element and through the turntable, said arms defining a circumferential surface of relatively large diameter for centering 45 R. P. M. records having center holes of a like diameter, said turntable having slots for receiving the said arms, said slots being oversize relative to said arms so that the arms fit loosely therein and the element is accurately centered on the turntable by means of the spindle which is effective to guide the element in its vertical movement, the ends of said arms having portions formed to extend laterally beyond the edge of the slots respectively for movably securing the element to the turntable, and a single compression spring mounted coaxially of said spindle and contacting the surface of the depression in the turntable and the underside of the element, the bias force of said spring being relatively light such that it is compressed by the weight of a 33⅓ R. P. M. or a 78 R. P. M. record resting on the turntable to allow the element to sink into the depression yet positively urges the element to a raised position fitting in the center hole of a 45 R. P. M. record resting on the turntable.

2. In a record turntable having a spindle of about 9/32″ for centering records with smaller size center holes such as 33⅓ R. P. M. and 78 R. P. M. records, an attachment for centering records having relatively large diameter center holes, said attachment being mounted for vertical movement between a position in a depression in the center of the turntable and a raised position projecting above the surface of the turntable and comprising in combination, a centering element fitting about the spindle for sliding movement and having a stepped circumferential surface defining a plurality of relatively large diameters for centering records having center holes of corresponding size, said spindle guiding the centering element, said element including a plurality of horizontally disposed radial arms with portions bent down from said element and extending through the turntable, said turntable having slots for receiving the said arms, said slots being oversize relative to said arms so that the arms fit loosely therein, said portions of said arms being stepped to define said stepped circumferential surface, the lower ends of said portions of said arms being formed to extend laterally thereof beyond the edge of the respective slot for movably securing the element to the turntable, and a single compression spring mounted coaxially of said spindle and contacting the surface of the depression in the turntable and the underneath surface of the element, the bias force of said spring being relatively light such that it is compressed by the weight of 33⅓ R. P. M. and 78 R. P. M. records resting on the turntable to allow the element to sink into the depression yet positively urges the element to a raised position.

References Cited in the file of this patent

UNITED STATES PATENTS

| | | |
|---|---|---|
| 874,985 | O'Neill | Dec. 31, 1907 |
| 1,440,276 | Cerveny | Dec. 26, 1922 |
| 2,554,919 | Mullaney | May 29, 1951 |
| 2,693,364 | Chalfin | Nov. 2, 1954 |